E. W. SEAHOLM AND G. E. PARKER.
TIRE CARRIER.
APPLICATION FILED NOV. 6, 1919.
1,419,080.
Patented June 6, 1922.
2 SHEETS—SHEET 2.
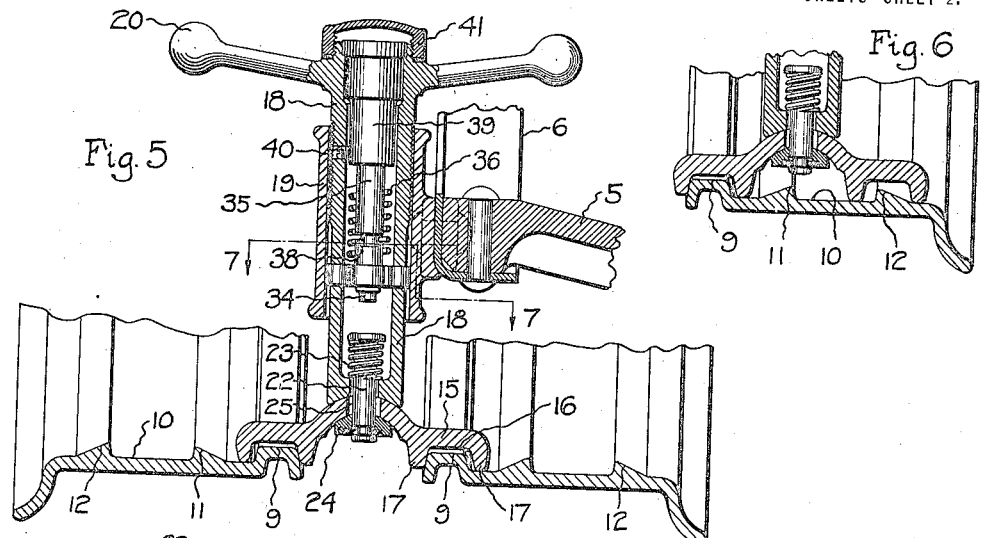
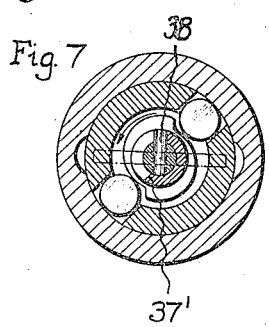
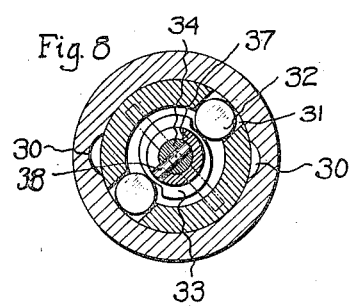
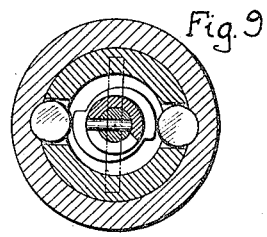
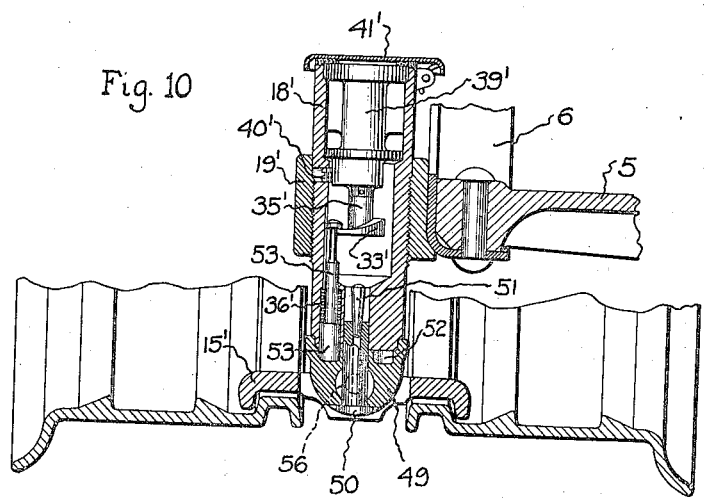
Inventor
ERNEST W. SEAHOLM &
GUY E. PARKER
By Attorneys
Blackmore, Spence & Flint.

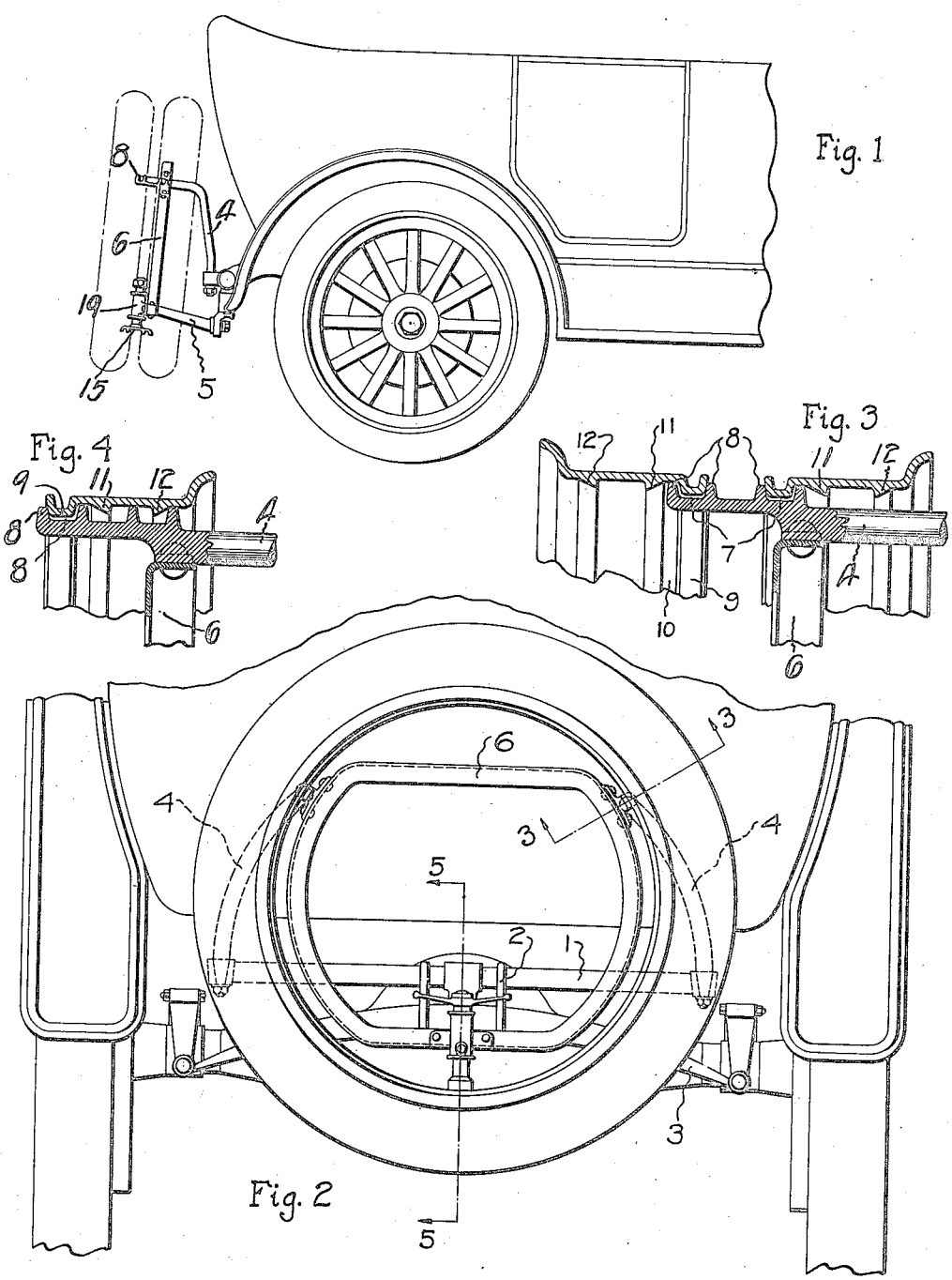

UNITED STATES PATENT OFFICE.

ERNEST W. SEAHOLM AND GUY E. PARKER, OF DETROIT, MICHIGAN, ASSIGNORS TO GENERAL MOTORS CORPORATION, OF DETROIT, MICHIGAN, A CORPORATION OF DELAWARE.

TIRE CARRIER.

1,419,080. Specification of Letters Patent. Patented June 6, 1922.

Application filed November 6, 1919. Serial No. 336,123.

*To all whom it may concern:*

Be it known that we, ERNEST W. SEAHOLM and GUY E. PARKER, citizens of the United States, and residents of Detroit, county of Wayne, and State of Michigan, have invented certain new and useful Improvements in Tire Carriers, of which the following is a full, clear, concise, and exact description, such as will enable others skilled in the art to which the invention relates to make and use the same, reference being made therein to the accompanying drawings, which form a part of this specification.

Double tire carriers as ordinarily constructed comprise two sets of pads or contacts on the horns or arms so constructed and arranged that one tire may be carried on each set: if a single tire is to be carried it must either be mounted on the forward set, in which case the rear end portions of the horns form unsightly projections, or on the rear set, which causes the tire to appear unduly spaced from the car body. The construction is, moreover, unnecessarily expensive.

A leading object of the present invention is to provide a carrier adapted to hold two tires and so arranged that both are fixed in position thereon by merely turning or otherwise projecting a single member. This is preferably accomplished through the use of a pivotally mounted shoe or contact device so arranged as to distribute the pressure from the projectable member equally to the rims.

A second primary object is to provide a tire carrier having a single set of pads or contacts whereon either one or two tires may be carried at will. Thus when two tires are carried both are offset from the central transverse plane of the pads, giving the usual appearance, but when one tire is carried it may occupy a substantially intermediate position, fairly close to the body, wherein it screens or substantially screens the ends of the horns from side view. As indicated herein, this is preferably accomplished by arranging the pads symmetrically about a transverse plane and by so constructing them that the tires may be received thereon in reverse relation to each other: when the single tire is to be carried, it is preferably positioned centrally over the contact with its main rib received in those depressions of the pads wherein the main rib of the other tire would be received in case two were carried.

A third primary object is to provide a locking tire carrier construction of such nature that the rim may be conveniently and securely locked thereon. By associating the lock with the single projectable member heretofore mentioned, one lock is made to suffice for holding both tires, and no exposed parts, such as occur in padlocks, are presented for the application of a jack or other tool whereby they might be cut or broken. We believe that we are the first to employ any construction wherein a single housed or encased lock, operating in conjunction with a projectable tire holding element, serves to hold a plurality of tires, or wherein a single projectable element serves to apply holding pressure for a plurality of tires. In both embodiments shown, this is secured by encased means of such nature that a locking condition is set up between a radially movable shoe or contact-carrying member and a bracket wherein it is threaded, so that said member cannot be unscrewed without unlocking the lock. The details of construction may vary considerably: in one of the embodiments shown a pair of rollers or balls are pressed out into locking relation by means of a cam, while in another a spring pressed plunger is used. In both cases the user need pay no attention to the particular angular position of the threaded member at the time of locking, since any effort to unscrew said member is automatically followed by the interengagement of the rollers or plunger with the corresponding seat. It will be understood that the locking feature may be applied in connection with carriers so constructed as not to be capable of supporting more than one tire in any event.

In the drawings. Fig. 1 is a side elevation of the rear portion of an automobile (the springs being omitted) showing a preferred embodiment of the invention. The position of the tires, when two tires are carried, is indicated in dashed lines, Fig. 2 is a rear elevation corresponding to Fig. 1. Figs. 3 and 4 are sections on lines 3—3 of Fig. 2 respectively showing the manner of disposing two rims and one rim on the pad or contact. Fig. 5 is a vertical section on line 5—5 of Fig. 2, two rims being shown.

Fig. 6 is a similar section showing the preferred manner of holding a single tire. Figs. 7, 8 and 9 are sections on line 7—7 of Fig. 5, showing the locking means in different positions. Fig. 10 is a view, similar to Fig. 5, showing a modification.

The carrier frame is of the type shown in United States Letters Patent Reissue Number 14,215, granted November 14, 1916, to Snell, and comprises the cross bar 1 shackled at 2 to the rear cross-spring 3, the members 4 extending upwardly, inwardly and rearwardly from the ends of the crossbar, the bracket or arm 5 (also rigidly attached to the cross-spring), and the circumferential brace 6 riveted to the corresponding end portions of the members 4 and 5. It is to be understood that other frame constructions wherein ample bracing of the end portions of the members 4 and 5 in respect to one another is secured, may be employed, but the particular construction shown has proven highly desirable for the purpose. In the event the carrier is intended to be capable of carrying two tires the contact portions of the elements 4—5 preferably differ from those of the patented construction in the manner best shown in Figs. 3 and 4 from which it will be seen that the depressions 7 and projections 8 are so arranged as to co-operate with the corresponding ribs 9 and depressions 10 found on the inner surface of the rim. The actual construction of the contact portions of the arms 4—5 will obviously depend somewhat on the cross-sections of the rims with which they are to co-operate: in the rim shown, there are, besides the main ribs 9, a pair of ribs 11—12 spaced from each other on the same side of the rib 9, and the depressions 7 are spaced from each other the proper distance to receive the ribs 9 and 12; or, putting it another way, the two inner projections 8 are arranged to be received in the grooves between the rib 9 and the rib 11 and between the latter and the rib 12. Evidently, the rim might be replaced by other ring-like devices not intended for use except in carrying the tire.

The third contact member appears best in Figs. 5 and 6 from which it will be seen that it comprises a shoe 15 having depressions 16 and projections 17 corresponding, respectively, both in shape and spacing, to the parts 7—8 heretofore described. This member is preferably mounted for universal pivotal movement on the end of the hollow threaded member 18 that may itself be turned in and out by the hand grips 20 in relation to an associated bracket 19 riveted to the arm 5 through the brace 6. A pin 22, spring 23 and spherical washer 24 hold the shoe in position; it being noticed that clearance is preferably provided at 25 to allow slight movement of the shoe transversely of the pin 22. The construction thus far described constitutes a highly desirable carrier whereby the tires, whether one or more, are neatly supported. If two, they are arranged in reverse order; if but one, it may be regarded as being arranged in the same relation it would otherwise occupy but with the difference that it is offset therefrom a distance equal to that between the ribs 9 and 12, although it might obviously be reversed. The movement of the shoe 15 in respect to the member 18 insures proper engagement with the rim or rims, distributing the pressure substantially equally to the two tires or to opposite sides of the one, as the case may be.

*Locking features.*—That portion of the cylindrical casing member 19 beyond the threads is provided in the construction shown in Fig. 5, with one or more longitudinal internal grooves 30, and the wall of the hollow member 18 has corresponding openings 31 wherein the rollers 32 are positioned, these rollers being adapted to be pressed outwardly by the cam 33. The cam is mounted for limited angular movement about a reduced end portion 34 of a lock spindle or tumbler 35, a torsional spring 36, one end of which is attached to the cam and the other to the tumbler or spindle, tending always to keep the shoulder 37 on the hub of the cam against a pin or abutment 38. The lock housing or barrel 39 in which the spindle is rotatable by a key (not shown) is retained in the member 18 by a set screw 40 the head of which is covered by the upper edge of the casing bracket 19 when the shoe is in engagement with the rim or rims. A nut or cap 41 normally serves for excluding dirt from the locking mechanism.

It is evident that when the shoe 15 is brought into final engagement with the rim or rims, the rollers 32 will not always be in juxtaposition with the grooves 30. Such a condition is shown in Fig. 7, this indicating the unlocked position of the device. To lock, the key is turned say 135° in the direction of the arrow whereupon the parts assume the position indicated in Fig. 8. During this movement the cam is held from revolving by the rollers 32 which are in engagement with the inner surface of the bracket 19, but it will be understood that the tumbler 34—35 will revolve with the key. (The several angular positions of the latter are conventionally indicated by the dashed rectangles in Figs. 7, 8 and 9.) During this movement the pin 38 travels away from the shoulder 37 and occupies a position between it and the shoulder 37'. In the meantime the torsional spring has been given greater tension due to the change in angular position between the cam and the tumbler extension. The key may then be removed and when re-inserted for unlocking is manifestly operated against the tension of the spring 36. Now assuming that it is attempted to unscrew the member 18, the rollers 32 soon come opposite the grooves 30 whereupon the torsional spring snaps the cam against the pin 38, thus forcing the rollers out into locking positions.

In the construction shown in Fig. 10, the member 18', which corresponds to the member 18, is rotatable in a member 49 which is retained thereon as by means of the hollow pin 50 and wedge 51. This member 49 has a plurality of sockets 52 in either of which a spring pressed plunger 53 may be received to lock the element 18' against angular movement, it being understood that the shoe 15' which corresponds to the shoe 15, is connected to this member 49 by suitable pivots 56. The lock spindle 35' carries a cam 33' whereby the plunger 53 may be withdrawn from its socket when the key is manipulated. When the cam is in the locked position shown and effort is made to unscrew the element 18', the spring 36' snaps the plunger into the next registering socket. A suitable spring pressed cap 41' excludes dirt from the lock housing 39' and the latter is retained in the member 18' by a screw 40' normally concealed by the bracket 19' in the same general manner as heretofore explained.

In either embodiment shown it will be seen that there is found a fixed bracket, a member, 18 or 18', threaded therein for exerting pressure substantially radially of the tire or tires and a spring pressed lock-controlled element, 32 or 53, through which angular movement of said threaded member is prevented. Both embodiments also have the common chaacteristic of permitting the key to be turned to locking position regardless of the relation of the locking member 32 and 53 to its socket.

It will be understood that the principles of the invention may be embodied in various constructions that differ materially from those shown, and we do not therefore, wish to be limited except as indicated by the subjoined claims.

We claim—

1. In a vehicle, a pair of tire rims, carrier means for said rims, said means including a single element mounted for universal angular movement through which holding pressure is exerted substantially equally on said rims.

2. In a vehicle, a pair of tire rims, carrier means for said rims, said means including a member projectable substantially radially of said rims, and a shoe carried by said member and pivoted to swing substantially in a radial plane of said rims and also in a plane at right angles thereto for exerting approximately equal pressure on each rim.

3. In a tire carrier, a plurality of angularly spaced contact members adapted to hold a tire rim, a hollow threaded element on which one of said members is tiltably mounted, said member having a plurality of rim contacts, one on each side of the axis about which the member tilts, and a pin disposed longitudinally of said threaded element in the hollow thereof for retaining said tiltable member thereon.

4. A tire carrier comprising a relatively fixed element, a threaded member adapted to be screwed outwardly in said element for exerting holding pressure on the rim of a vehicle tire, and a lock-controlled element housed within said threaded member for preventing said member from being unscrewed from the relatively fixed element.

5. A tire carrier comprising two interengaging threaded members, one fixed relative to the other to cause linear movement of said other member for exerting pressure on a tire rim upon relative angular movement of said two members, a locking member housed in the movable member for preventing such angular movement, and a lock controlling said locking member.

6. A tire carrier comprising a first relatively fixed member, a second member threaded in the first member, a third member supported by the second member and adapted to engage the rim of a vehicle tire to hold the latter thereon, said second member being adapted for angular movement relatively to the third member, and lock-controlled means operable on two of said members, said means, when locked, permitting initial limited angular movement only of said second member and thereafter operating to prevent further angular movement of said member in either direction.

7. In combination with a tire carrier including a fixed bracket, a member threaded therein for exerting substantially radial pressure on the inner surface of a tire rim, and a spring pressed lock-controlled element movable with the threaded member as the latter is turned to apply pressure to the rim, through which angular movement of said member may be prevented at will.

8. Tire carrier means including a fixed bracket, a hollow member threaded therein, a locking device within said member for preventing angular movement thereof, a shoe carried by said member for holding a tire thereon, means for holding the locking device in the hollow member, said means being concealed by the bracket when the shoe is in holding relation to the tire.

9. Tire carrier means including a fixed bracket, a hollow member threaded therein to be moved toward a tire rim to exercise holding pressure thereon, a locking device housed in said hollow member, a set screw for holding said device in said member, said set screw being concealed by the bracket when said holding pressure is being exercised on the tire rim.

10. Tire carrier means including a fixed bracket, having a depression therein, a hollow member threaded therein, to be projected outwardly toward the inner surface of a tire rim, a lock housed in said member and having a rotatable spindle, a cam free for limited angular movement on said spindle, a spring tending to maintain the cam at one limit of its movement, and a locking element carried by the hollow member and arranged to be forced into said depression by the cam upon angular movement of the hollow member in respect to the bracket when the lock is locked.

11. Tire carrier means including a bracket, a hollow member threaded therein, a contact shoe construction in reference to which the hollow member is adapted for angular movement, said shoe construction having a socket, a spring pressed element carried by the hollow member and adapted to be received in said socket to prevent angular movement of the hollow member in respect to the socketed member, and a lock within the hollow member controlling the operation of the spring pressed element.

12. A tire carrier comprising a bracket having an aperture extending therethrough, a hollow member projectable through said aperture and guided by the walls thereof for exerting holding pressure on the rim of a tire, and a lock controlled element housed within the projectable member for locking said member to the bracket.

13. A tire carrier comprising two members, one of which is hollow and movable through the other for exerting holding pressure on a tire rim, means for locking the members against relative movement of such nature as to relieve the rim from said holding pressure, said locking means comprising an element extending longitudinally within said hollow member.

14. Tire carrier means comprising two members, one of which is hollow and movable with reference to the other for exerting holding pressure on a tire rim, means for locking said members against relative movement of such nature as to relieve the rim from said holding pressure, said locking means comprising an angularly movable element extending longitudinally within said hollow member.

15. Tire carrier means including a fixed bracket having a depression therein, a hollow member movable through said bracket toward a tire rim, a lock housed in said member and having a rotatable spindle, a cam free for limited angular movement on said spindle, a spring tending to maintain the cam at one limit of its movement, and a locking element carried by the hollow member and arranged to be forced into said depression by the cam.

16. In a tire carrier, a plurality of angularly spaced contact members adapted to hold a tire rim, a hollow element in reference to which one of said members is tiltably mounted, said member having a plurality of rim contacts, one on each side of the axis about which the member tilts, and a pin disposed longitudinally within said hollow element for retaining said tiltable member thereon.

In testimony whereof we affix our signatures.

ERNEST W. SEAHOLM.
GUY E. PARKER.